United States Patent [19]

Peterson

[11] Patent Number: 4,531,998

[45] Date of Patent: Jul. 30, 1985

[54] ADJUSTABLE TAPE CHUTE FOR TAPE LAYING MACHINE

[75] Inventor: David A. Peterson, Milford, Ohio

[73] Assignee: Cincinnati Milacron Inc., Cincinnati, Ohio

[21] Appl. No.: 597,547

[22] Filed: Apr. 6, 1984

[51] Int. Cl.³ .............................................. B65H 23/32
[52] U.S. Cl. .................................... 156/574; 156/521; 226/198; 226/199
[58] Field of Search ............... 156/521, 353, 542, 541, 156/574; 226/199, 197, 198; 271/238, 240, 253; 198/836, 837, 840; 242/76

[56] References Cited

U.S. PATENT DOCUMENTS

| 2,696,983 | 12/1954 | Anderson | 271/240 |
| 3,892,618 | 7/1975 | Griebat | 156/353 X |
| 3,896,983 | 7/1975 | Weinguni | 226/199 X |

Primary Examiner—David Simmons
Attorney, Agent, or Firm—Thomas M. Farrell

[57] ABSTRACT

An adjustable tape chute guides a composite tape on a tape laying machine. The chute has a main body with a central guide slot of nominal width, for receiving a composite tape. The exit end of the chute has a pair of opposite edge guides which are movable with an adjusting screw along guide pins to conform to the actual tape width, so the tape may be accurately deposited alongside previously deposited tape strips.

5 Claims, 5 Drawing Figures

ADJUSTABLE TAPE CHUTE FOR TAPE LAYING MACHINE

BACKGROUND OF THE INVENTION

The invention relates generally to machines for laying composite tape on a mold or other part surface. In the field of manufacturing composite structures from successive plys of composite tape, a tape laying machine is utilized having a tape dispensing head which will lay down strips of tape in successive passes across a workpiece. The tape employed on tape laying machines, such as might be used in the aerospace industries, is generally manufactured from strands of reinforcement impregnated with a resin. The tape is carried on a paper backing strip coated with a release agent so that the tape may be impressed on a work surface at a tape laydown station. The paper leaving the tape laydown station is gathered on a take-up reel. Typical reinforcements may consist of graphite, Kevlar ®, boron, fiberglass, etc. and may be impregnated with epoxy resin, for example.

The tape comes to the machine user in predetermined reel sizes and nominal tape widths of three, six, and twelve inches, for example. The tape is manufactured at a width tolerance of from +0 to −0.030 inch from the nominal size.

The tape is fed from a tape dispensing reel on the machine and passes through a chute which guides the tape and provides a solid backing platen for the paper carrier strip as the composite tape is severed.

Manufacturers of composite tape structures require that the gap between side-by-side tape lay-down strips be maintained to a predetermined dimension. Some require butting of adjacent strips, while others require that a controlled gap width be maintained. Applicant has determined that due to the tolerance variation of the tape, a problem may be encountered when the tape is smaller than the chute width. The tape wanders to one side or the other, and a larger gap than is desired may result when laying tape bidirectionally. To overcome this problem, it would therefore be necessary to provide a different chute for each different width of tape within the tolerance.

For proper control of the tape, applicant has determined that the chute width must not be more than approximately 0.005 inch larger than the tape width or less than approximately 0.010 inch smaller than the tape width.

It is therefore an object of the present invention to provide an adjustable tape chute for use in a composite tape laying machine, in which the width of the chute guide portion may be varied to accomodate a given reel of tape.

Another object of the present invention is to provide for separately adjustable sides on a tape laying chute for use in a tape laying machine.

A further object of the present invention is to provide an adjustable tape chute for a tape laying machine in which the sides of the chute are independently adjustable and are calibrated to give a visual indication of an adjustment.

SUMMARY OF THE INVENTION

The invention is shown embodied in a tape laying machine utilizing a tape head for laying composite tape, wherein an adjustable chute is provided, having a base member and having a nominal guide slot cut for its length, to provide nominal guiding of a composite tape passing through the guide slot. The base member serves as a backup platen when the tape is being cut. The outlet end of the guide slot of the base member has a first edge guide movably mounted to the member and comprising a first movable sidewall for the slot. A second edge guide member is likewise movably mounted to the base member with respect to the first tape edge guide and forms a second adjustable side wall of the slot. Adjusting screws are provided through the first and second edge guides and the screws are threadably received in the base member. Shoulders on the screws serve to force the first and second edge guides towards the base member to close or restrict the width of the guide slot. The edge guides are provided with springs to bias them away from the base member, i.e. to an open or less-restricted width of guide slot.

In the preferred embodiment, each of the adjusting screws are provided with a graduated dial which may be visually aligned to a witness mark on the base member so that minute adjustments may be accomplished.

BRIEF DESCRIPTIONS OF THE DRAWINGS

DESCRIPTION OF THE PREFERRED EMBODIMENT

Figure 1:
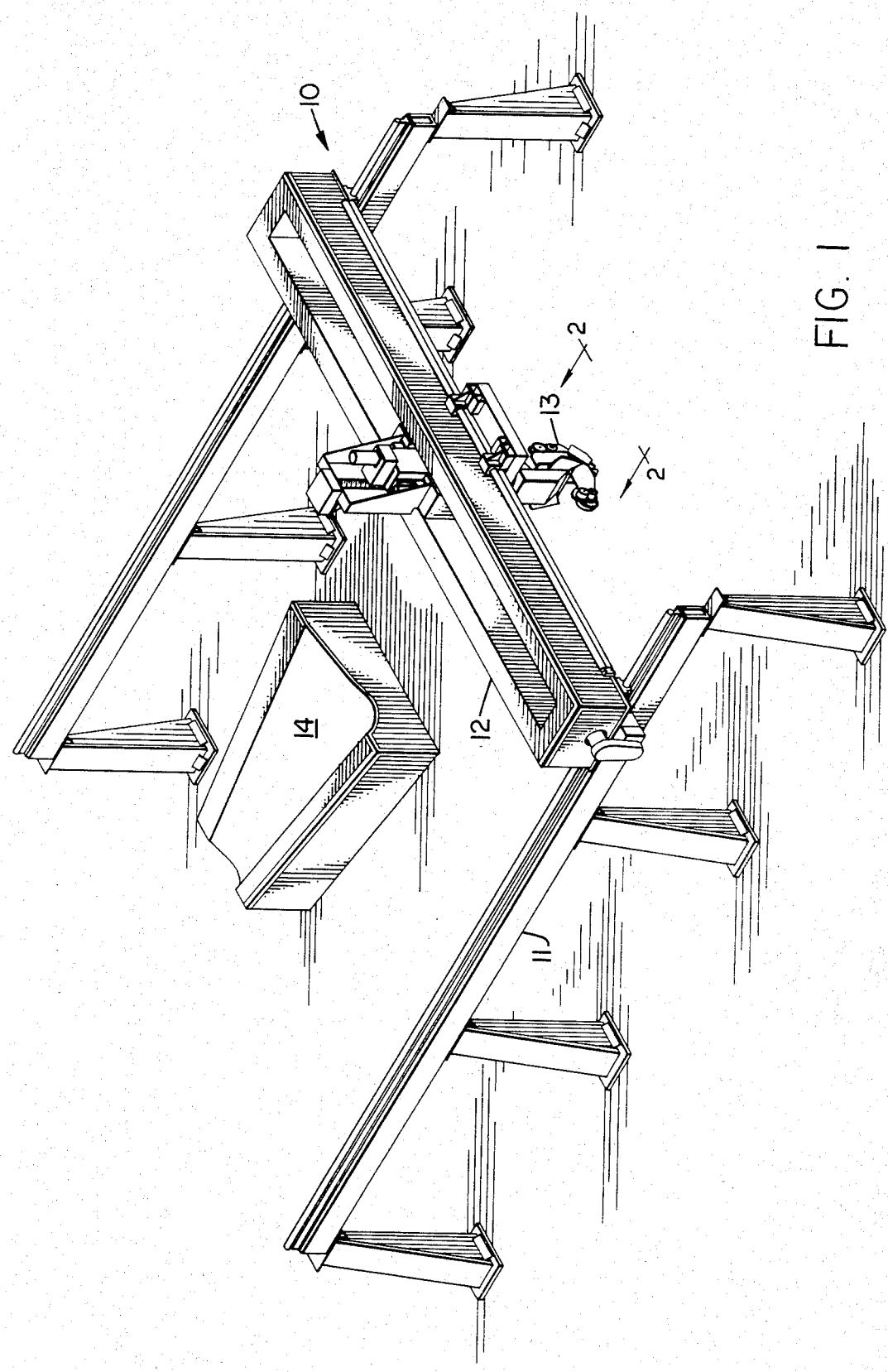
FIG. 1 is a perspective view of a tape laying machine employing a tape head for laying composite tape on a mold member.

FIG. 1 of the drawings depicts a tape laying machine 10 having a base 11, a movable overhead gantry 12, and a tape head 13 carried thereon for movement in relation to a part mold or laydown surface 14.

Figure 2:
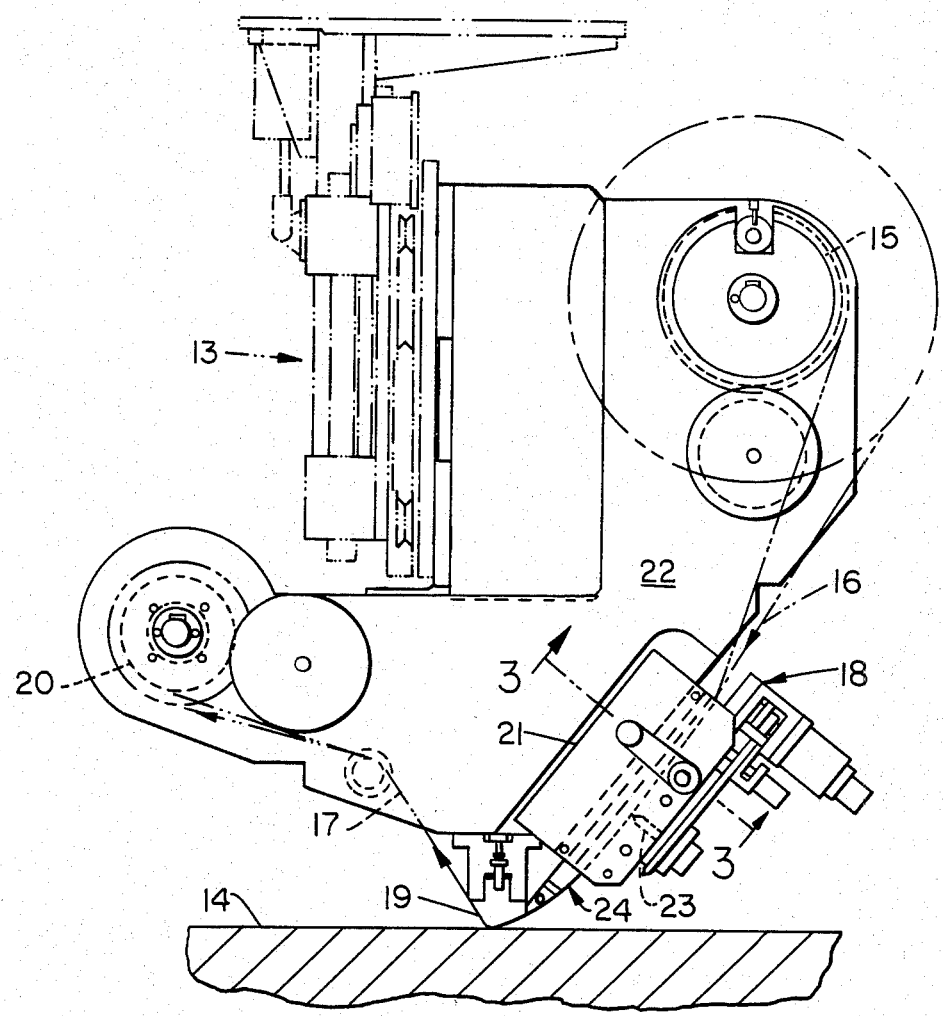
FIG. 2 is a side elevation view of the tape head taken in the direction of arrow 2 of FIG. 1.

The enlarged view of FIG. 2, depicts the tape head 13 in relation to the part laydown surface 14. For clarity, the details of construction and operation of the tape laying head 13 are not disclosed. It is sufficient for the understanding of the invention, to realize that the tape head 13 employs a dispensing reel 15 at an upper location, and the composite tape 16 is carried on a paper backing strip 17 and the two are trained down through a tape chute assembly 18, around the tape laying shoe 19, where the composite tape 16 is deposited on the work surface 14 as the tape head 13 makes successive passes across the workpiece. The paper carrier strip 17 leaving the tape laying shoe 19 is gathered on a take-up reel 20. The tape chute assembly 18 comprises a frame 21 bolted to the tape head main housing 22, and the frame 21 carries a power driven knife 23 (sharpened stylus or rotary blade) which is movable transversely across the tape 16 as the tape 16 moves through the chute assembly 18. The knife 23 is orientable with respect to the tape 16 for accomplishing a desired profile of cut. The tape chute assembly 18 carries an adjustable tape chute 24 which extends overall from the entrance portion of the tape chute assembly 18 to the tape laydown shoe 19. The details of construction of the adjustable tape chute 24 will be more fully appreciated in the following descriptions of FIGS. 3, 4 and 5.

Figure 3:
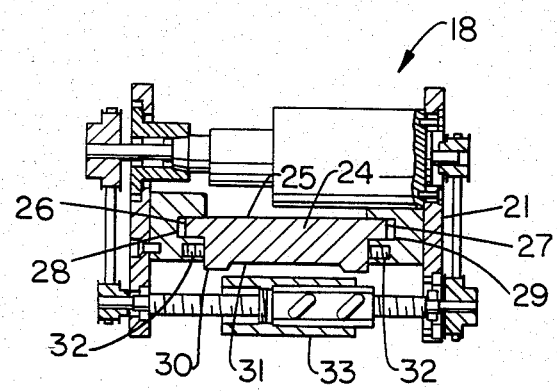
FIG. 3 is a section through the tape head chute assembly, taken along the line 3—3 of FIG. 2.

The sectional view shown in FIG. 3 depicts that the tape chute 24 has a generally T-shaped cross section, that is, the relatively solid base member 25 of the tape chute 24 has side extensions 26,27 which are received in cooperating close-fitting slots 28,29 in the tape chute assembly frame 21. The tape chute 24 may be readily slid out of the tape chute assembly frame 21 for replacement with respective tape chutes designed for various nominal tape widths and for cleaning resin deposits. The bottom surface 30 of the tape chute 24 has a central slot 31 machined to a shallow depth, and the slot 31 is controlled to a nominal width to accomodate a given nominal tape size. The position of the tape chute 24 in the tape chute assembly frame 21 is controlled by adjusting screws 32 received in the frame 21 and positioned against the base member extensions 28,29. In this manner, therefore, the tape chute 24 will be locked and positioned correctly with regard to a movable knife assembly 33.

Figure 4:
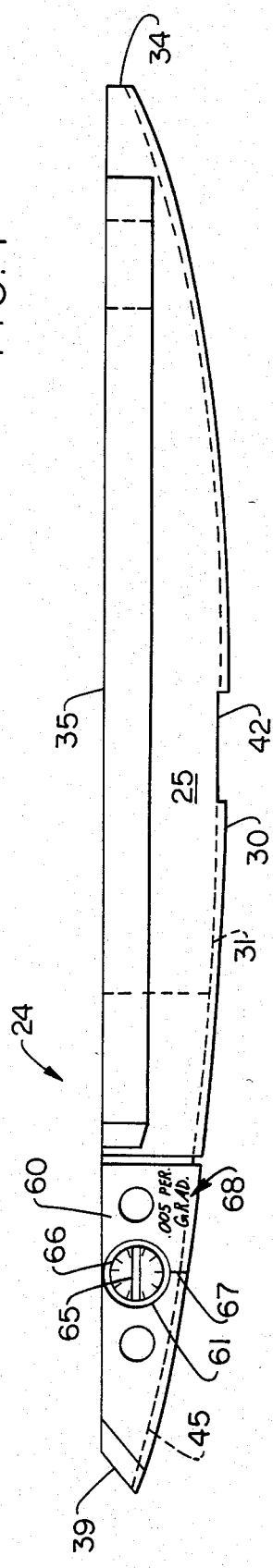
FIG. 4 is an enlarged view of the adjustable tape chute of FIG. 2, removed from the tape chute assembly.
Figure 5:
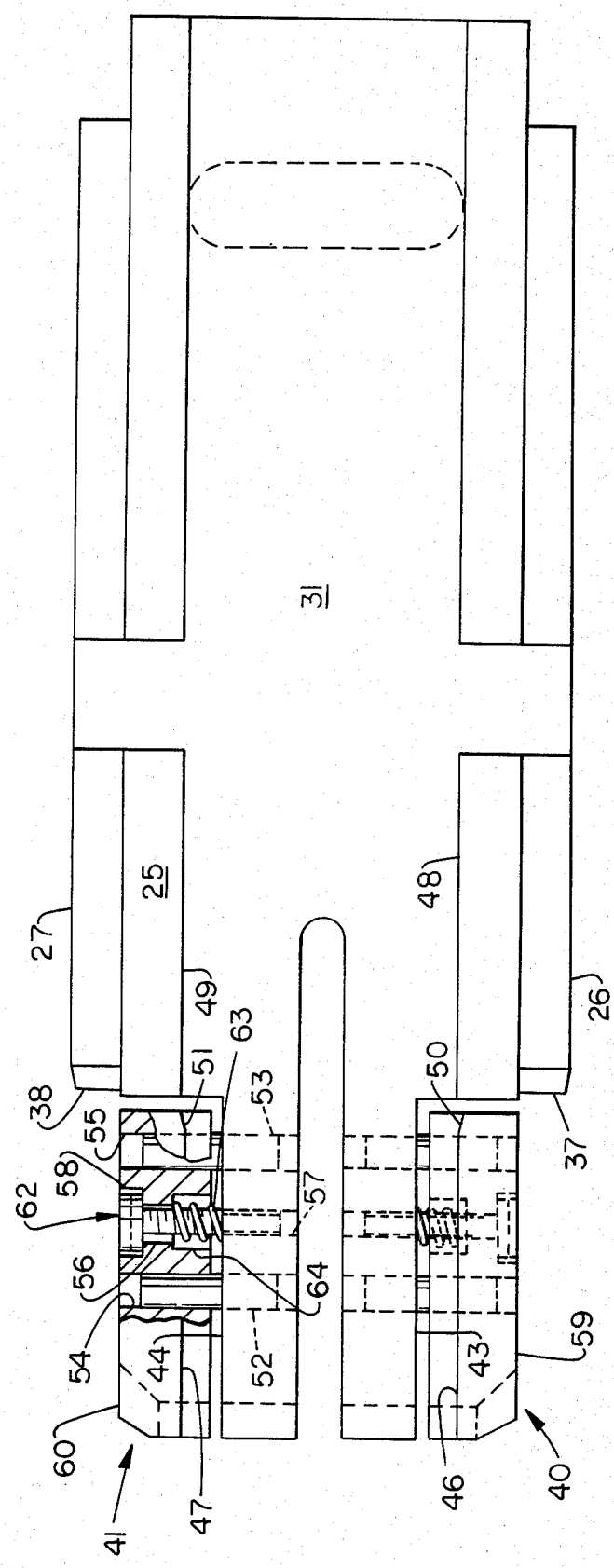
FIG. 5 is a bottom plan view of the adjustable tape chute taken in the direction of arrow 5 of FIG. 4.

FIGS. 4 and 5 will be described and referred to concurrently, to more fully appreciate the construction of the adjustable tape chute 24, which has been removed from the assembly 18 and enlarged for clarity. The base member 25 has an overall length with one end 34 squared-off relative to its upper locating surface 35, while the other end 36 is mitered off to present a surface which will abut the tape laying shoe 19. The side extensions 26,27 of the base member 25 are parallel to the upper locating surface 35, and the forward ends 37,38 of the extensions 26,27 are mitered off to provide a smooth entry of the tape chute 24 into the tape chute assembly base frame 21. The forward end 39 of the base member 25 is provided with first and second tape edge guides 40,41 which are adjustable to control the composite tape 16. As seen in FIG. 4, the bottom surface 30 of the tape chute 24 is arcuate, and the tape guide slot 31 is held to a controlled depth from the bottom surface 30. Therefore, the guide slot 31 is arcuate as well. The mid-span portion of the bottom surface 30 of the tape chute 24 is provided with a transverse slot 42 across its entire width, to accommodate the transversly movable knife 23 (FIG. 2) for severing the composite tape 16 on the paper carrier strip 17.

The view depicted in FIG. 5 shows that the tape guide slot 31 is of constant width and held to a nominal dimension throughout the main portion of the base member 25. The forward end 39 of the base member 25, however, has a right angle notch relief 43,44 at each side thereof, to accommodate the first and second movable tape edge guides 40,41 respectively. The tape edge guides 40,41 are shaped to the general configuration of the base member 25, and have an interior surface 45 curved to match the arcuate slot 31. The edge guides 40,41 have upstanding walls 46,47 which serve to continue as extensions of the side walls 48,49 of the guide slot 31 in the base member 25. The lead-in corners 50,51, of the tape edge guides 40,41 are mitered to prevent any hangup of the tape when passing through the movable edge guides 40,41.

The base member 25 has a pair of pins 52,53 tightly received therein, extending outward from each notch relief 46,47 parallel to the upper locating surface 35. The tape edge guides 40,41 have cooperating pin holes 54,55 which are machined to a slip fit with the pins 52,53. The edge guides 40,41 have a through clearance hole 56 machined between the pin holes 54,55 and a tapped hole 57 is provided in the base member 25 in line with the clearance hole 56. A counterbore 58 is provided at the outer surface 59,60 of the edge guides 40,41, so that the head 61 of an adjusting screw 62 may be shouldered against the counterbore 58. The edge guides 40,41 are back-counterbored from the interior surface, to provide a seat for a compression spring 63 received between the counterbore 64 and the notch relief 43,44 of the base member 25. The adjusting screw 62 is received through the edge guide clearance hole 56 and is threadably received in the base member 25. By this structure, it can be seen that when it is desired to restrict the width of the nominal tape guide slot 31, the edge guides 40,41 may be moved toward one another by turning the adjusting screw 62. The compression springs 63 serve to bias the edge guides 40,41 to an open position. Therefore, when the adjusting screws 62 are rotated in an opposite direction to open the width of the guide slots 31, the edge guides 40,41 will follow under the influence of the biasing springs 62. The head 61 of the adjusting screw 62 is provided with a screwdriver slot 65, for ease of rotation, and a series of facial dial graduations 66 are provided on the head 61 which are alignable to a witness mark 67 inscribed on the outer surface 59,60 of the edge guide 40,41. In the example shown, a screw with 0.050 inch lead per revolution, i.e. 20 threads per inch, is selected and the dial graduations 66 are equally divided into ten parts. Therefore, each dial graduation 66 represents 0.005 inch movement of the tape edge guide 40,41. Other pitches may be selected to accomplish finer micrometric adjustments. The outer surface 59,60 of the edge guide 40,41 is also stamped with the legend 68 showing the adjustments corresponding to the graduations 66.

It may be appreciated that, in some instances, it may be preferable to have only one tape edge guide movable, while the other remains in a fixed position.

It may be also appreciated that other shapes of the tape chute may be utilized, i.e. where the tape chute does not have an arcuate slot, but rather has a slot which is linear over its entire length.

While the invention has been shown and described in connection with a preferred embodiment, it is not intended that the invention be limited to such embodiment, but rather the invention extends to all such designs and modifications as come within the scope of the appended claims.

What is claimed is:
1. In a tape laying machine utilizing a tape head for laying composite tape strips on a laydown surface, said head movably carried on said machine with respect to said surface, an adjustable tape chute mounted on said head, comprising:
 (a) a base member;
 (b) first and second tape edge guides independently mounted to said base member on means for adjustably slipping said guides, each guide having a guide wall with said walls being oppositely disposed thereby forming a tape slot to guide opposite lateral sides of a tape strip;
 (c) fine adjustment means for independently adjusting said guides with respect to said base member, said fine adjustment means including;
 (d) solid shouldering means for positively maintaining said edge guides in respective adjusted positions limiting the maximum width of said formed tape slot.

2. The adjustable tape chute of claim 1, further comprising means for indicating the respective positions of said first and second tape edge guides.

3. The adjustable tape chute of claim 1, further comprising means for biasing said guides against said solid shouldering means.

4. The adjustable tape chute of claim 3, wherein said fine adjusting means comprises a pair of screws each threadably received in said base member and shouldered against a respective tape edge guide, and wherein said means for biasing comprises a pair of springs, each reacting against said base member and a respective tape edge guide.

5. The adjustable tape chute of claim 4, further comprising a rotary dial on said screw alignable with a witness mark on said base member.

* * * * *